INVENTOR.
SEYMOUR LEOPOLD 3,250,252
VETERINARY ANIMAL RESTRAINING
APPARATUS
Seymour Leopold, 26 Grassy Plain St., Danbury, Conn.
Filed May 28, 1964, Ser. No. 370,870
13 Claims. (Cl. 119—103)

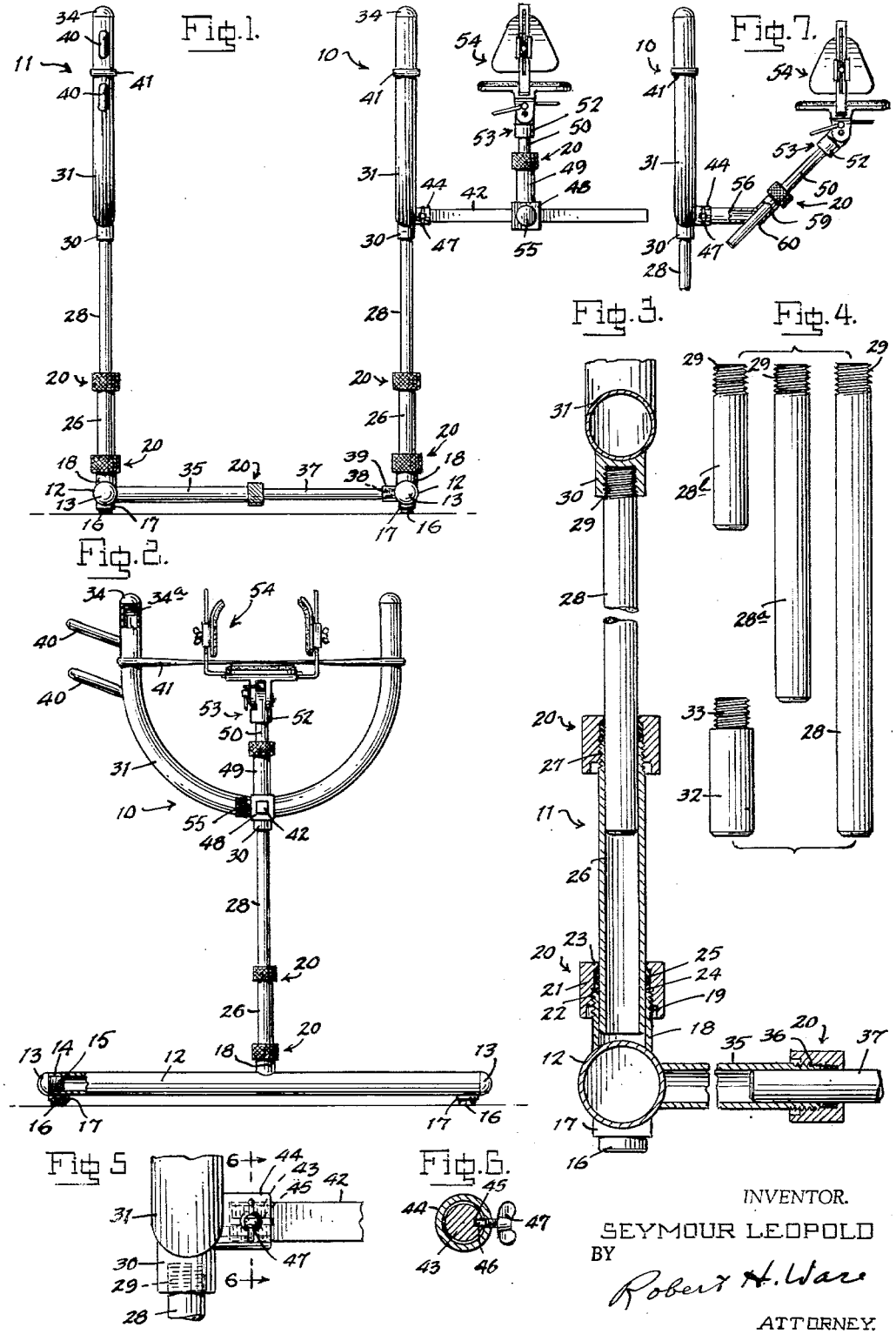

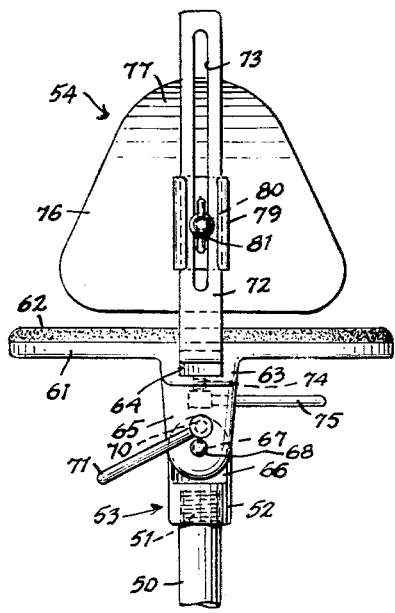
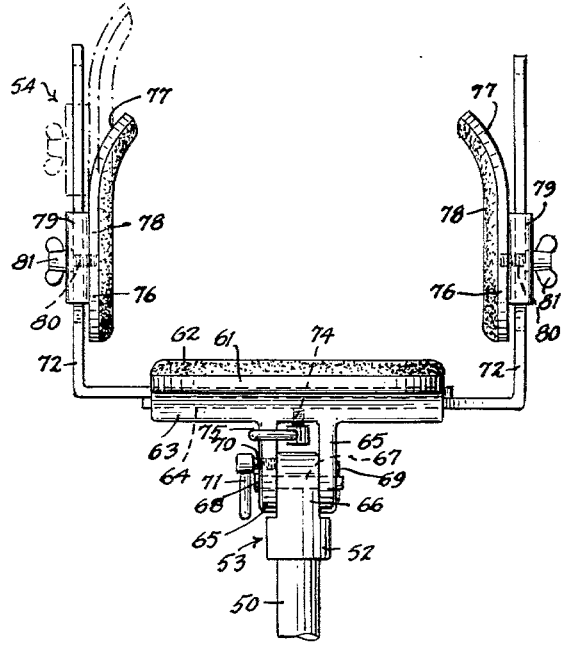
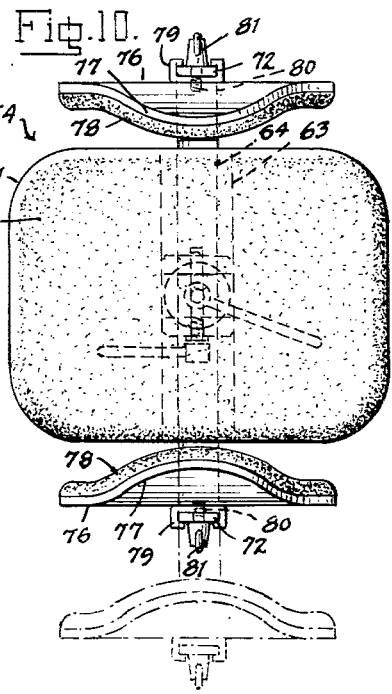
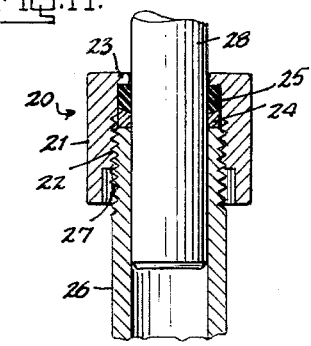

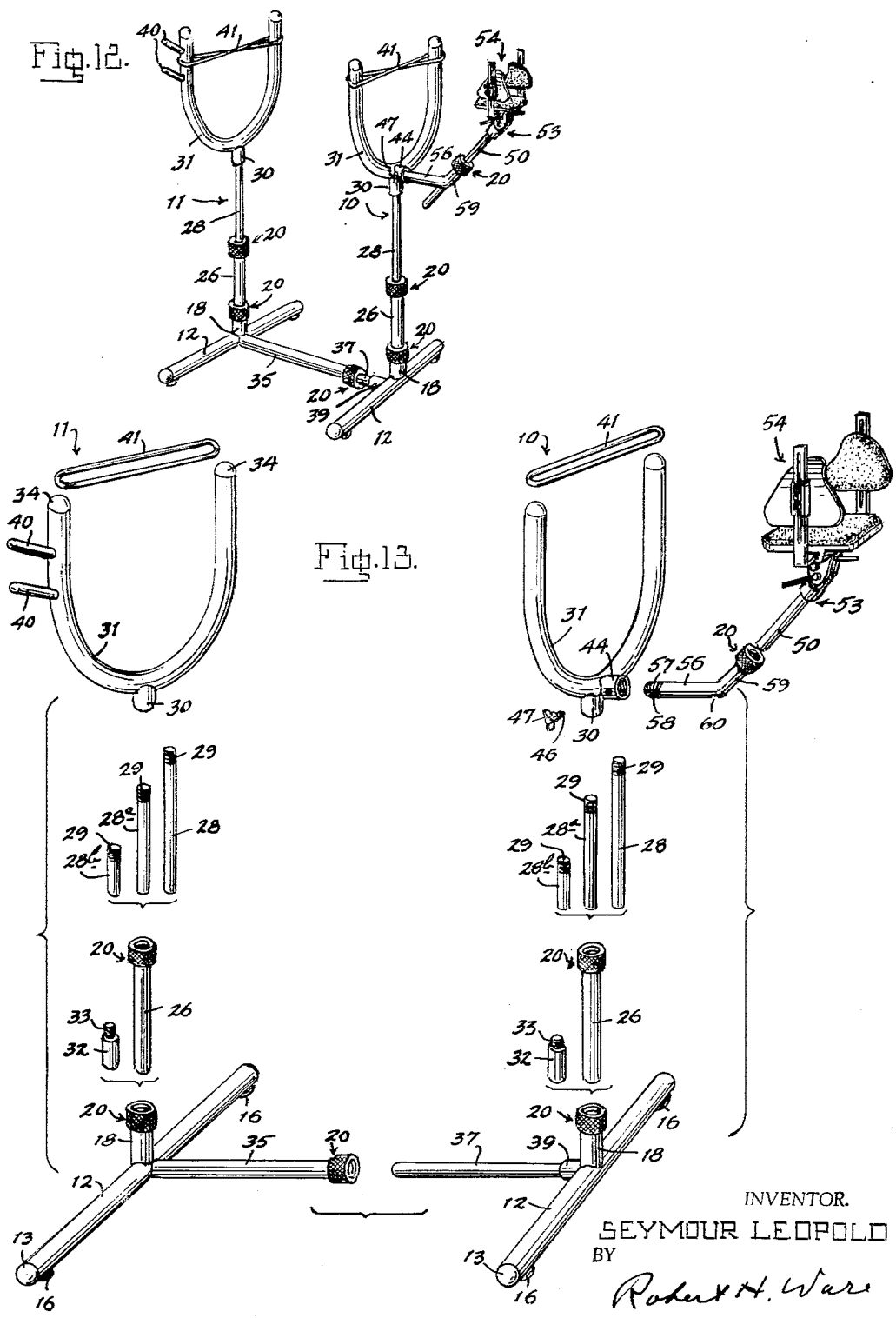

This invention relates to an animal restraining apparatus especially for use by veterinarians in performing various operations upon small animals, particularly dogs, while such animals are restrained in a standing, natural and relaxed position. Many such operations, particularly with dogs, normally require that the animal be restrained in a standing position, and it is most desirable that all parts of the body be readily accessible and exposed. In performing such operations it has heretofore been necessary for an assistant to manually restrain the animal, which is not only expensive but tends to excite the animal, causing it to assume a tense, unnatural position. Also, the necessary proximity of the assistant to the animal interferes with the efficient administrations of the veterinarian.

It is an object of the invention to provide an apparatus which may by easy adjustment be applied to the many breeds of dogs of different shapes and sizes to effectually restrain and immobilize the animal in a standing position, at the same time obviating the necessity of an assistant during the performance of the required operations upon the animal. It is particularly proposed to provide an apparatus through which the animal may be slightly uplifted while remaining in a standing position so that its legs will be sufficiently stretched or extended to enable its paws to have contact with a supporting surface to thus permit the animal to support itself in a standing position, while at the same time preventing it from obtaining sufficient traction or purchase to propel itself.

The invention thus greatly facilitates the performance in the required standing position of such operations as the following: clipping and bathing, X-ray exposure, application of plaster of Paris casts, bandaging, orthopedic surgery and rectal area operations, eye treatment, dentistry, breeding, ear cropping, trocarization of abdomen or chest, etc.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a side elevation of an apparatus according to the invention;

FIG. 2 is an end elevation, partly in vertical section, as seen from the right in FIG. 1;

FIG. 3 is an enlarged fragmentary vertical longitudinal sectional view of the rearward part of the apparatus;

FIG. 4 is a side elevation of a set of extension posts as employed in the apparatus;

FIG. 5 is an enlarged fragmentary view of the joint connection between the forward part of the apparatus and the head supporting means;

FIG. 6 is a sectional view taken along the line 6—6 of FIG. 5;

FIG. 7 is a fragmentary side elevation of a modified form of the head support;

FIG. 8 is an enlarged side elevation of the head support;

FIG. 9 is a front elevation thereof;

FIG. 10 is a plan view thereof;

FIG. 11 is an enlarged detail sectional view of a typical clamp means employed in the apparatus;

FIG. 12 is a perspective view of the apparatus including the head support bar as seen in FIG. 7;

FIG. 13 is an exploded perspective view of the several parts of the apparatus;

Figure 14:
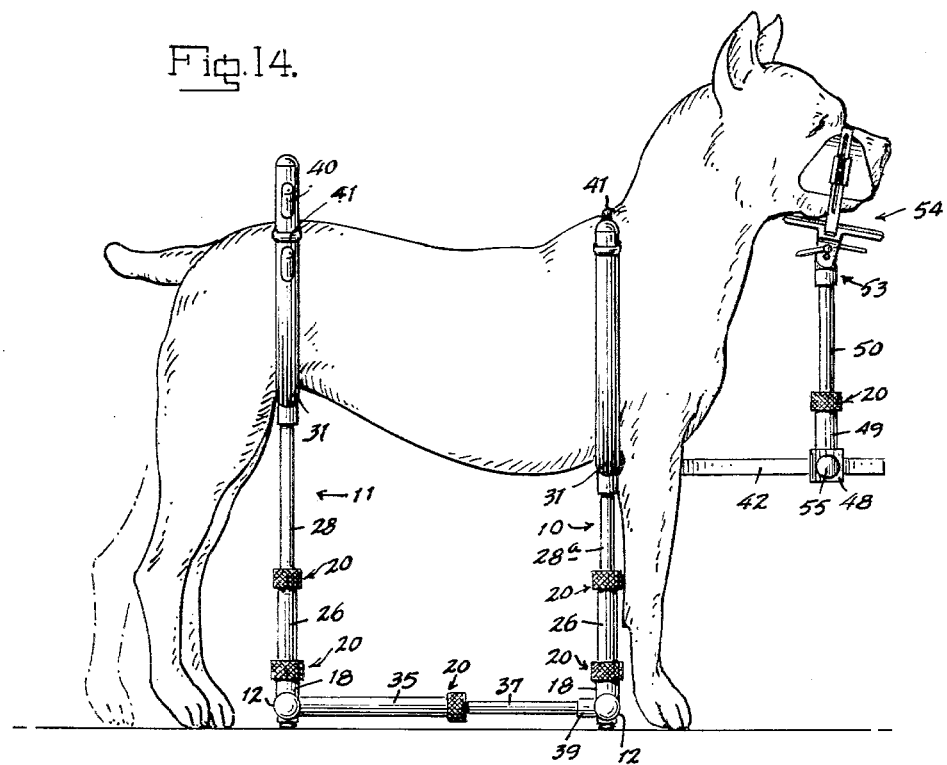
FIG. 14 is a side elevation showing the apparatus as applied to a dog of relatively large size.

Referring to the drawings and particularly to FIGS. 1-6, the exemplary embodiment of the apparatus of the invention for carrying out the method of the invention generally comprises forward and rearward vertically adjustable frame supports, for receiving the body of the animal just rearward of the forelegs and just forward of the hind legs, and a longitudinally adjustable connection between the forward and rearward parts to adjust the apparatus to the length of the particular animal, the vertical adjustability of the forward and rearward frame supports accommodating the apparatus to the particular height of the animal.

The forward and rearward frame supports 10 and 11 are substantially identical in form and each comprises a horizontal base bar 12, preferably of cylindrical tubular form, having an end closure cap 13 secured in each of its internally threaded ends 14 as by a threaded stud 15 screwed therein. Adjacent each end the bar is provided at its lower side with a cushion foot 16 preferably of rubber fitted into a metal cup 17 secured as by welding. At its center the base bar is provided at its upper side with a vertical tubular stud post 18, preferably secured by welding, its upper end being externally threaded as at 19 and mounting a friction clamp 20 for adjustably securing a telescoping part received in the stud post.

The clamp 20 is preferably of the well-known type used in microphone stands for vertically adjusting the telescoping parts thereof, and the use of a number of such clamps in the present apparatus makes for the easy and positive adjustment and securing of the several telescoping parts thereof while the apparatus is being fitted or adapted to the particular animal being restrained. As seen more clearly in FIG. 11, the clamp 20 comprises an externally knurled tubular collar 21 having internal screw threads 22 adjacent its lower end for engagement with the externally threaded end of the post, and provided at its upper end with an inwardly extending flange 23 defining a central opening for receiving the telescoping part. A beveled pressure ring 24 is slidably engaged within the collar for engagement with the upper end of the post, and between this ring and the flange 23 there is disposed an elastic ring 25, preferably of rubber, which is adapted upon being compressed between the flange and the compression ring 24 through screwing down of the collar 21 to expand inwardly to frictionally engage and retain the telescoping part. Upon screwing the collar upwardly the elastic ring releases to permit free sliding movement of the telescoping part.

As seen in FIG. 3, the telescoping part engaged with the stud post comprises a cylindrical tubular extension post 26 having an external diameter to slidably fit within the stud post 18, its upper end being externally threaded as at 27 and mounting a friction clamp 20. The extension post 26 is employed in the apparatus to accommodate it to medium- and large-sized animals, and for this purpose is adapted to receive a selected one of a set of extension rods 28, 28a and 28b of varying lengths, each of an outside diameter to slidably fit within the extension post and each having exterior threads 29 at its upper end for engagement in an internally threaded socket 30 secured as by welding to the lower side of a cradle support 31 adapted for engagement with the body of the animal. In addition to the limited adjustability of the extension post 26 within the stud post 18, the selectivity provided by the set of extension rods and their adjustability in the extension post 26 permits of a complete range of vertical adjustment to accommodate animals ranging in height from medium to very tall. In the case of a very short animal the extension tube 26 is replaced by a relatively short extension rod 32 having an outside diameter corresponding to the outside diameter of the extension tube and provided at its upper end with a threaded stud 33 for engaging the threaded socket 30.

The cradle support 31 is formed of a cylindrical tube bent to shape, being of generally U-shape and including a substantially semi-circular lower trough portion and vertically extending upper side portions, internally threaded at their upper end and each engaged by a closure cap 34 having a threaded stud 34a screwed therein. In practice, the cradle support defines a space approximately 10 inches wide by 10 inches high which has been found to be suitable for accommodating all sized dogs up to those of maximum girth.

The forward and rearward frame supports 10 and 11 are connected by a longitudinally extending telescoping connection comprising a tubular member 35, secured as by welding centrally of the inner side of the base bar 12 of the rearward support and provided at its outer threaded end 36 with a friction clamp 20, and an extension rod 37 telescopingly engaged at one end within the tubular member and the clamp, its other end being threaded as at 38 and screwed into a threaded socket 39 secured as by welding centrally to the inner side of the base bar of the forward support.

A pair of inclined hanger pegs 40—40 are secured by welding to one of the upright sides of the cradle member of the rearward frame support for the purpose of supporting in a conveniently accessible position rolls of adhesive tape and appropriate implements for use by the veterinarian in administering to the animal. Obviously such pegs may also be provided at other suitable locations on both the front and rear frame supports. A pair of heavy elastic bands 41—41 are provided for the respective cradle members, to be looped in stretched relation over the upright sides thereof for the purpose of preventing the animal from raising up or climbing out of the cradles, the elasticity of these bands accomplishing this purpose without excessive or painful pressure upon the animal.

The forward frame support 10 is provided with an adjustable support for the head of the animal comprising a horizontal bar 42 of rectangular cross-section secured centrally to the forward side of the cradle support 31 by a threaded stud 43 at one end screwed into a threaded socket 44 secured as by welding to the cradle. The threaded stud is provided with a longitudinal slot 45 engaged by the key end 46 of a thumb screw 47 provided in one side of the socket for the purpose of preventing the bar 42 from turning. A rectangular slide member 48 is engaged for longitudinal adjustment upon the bar 42 and has welded to its upper side a tubular post 49 provided at its upper end with a friction clamp 20, an extension rod 50 being telescopingly engaged for vertical adjustment within the tubular post and having a screw threaded upper end 51 screwed into the threaded socket 52 of a clevis type pivot support member 53 for the head support unit 54. The slide member 48 is adapted to be fixed in its position of longitudinal adjustment by a set screw 55 and the head support unit is adapted to be fixed in its position of vertical adjustment by tightening the friction clamp 20. The extension rod 50 is of the same diameter as the extension rods 28, 28a and 28b and may, for the purpose of providing maximum adjustment for fitting the head support unit to various sized animals, be interchangeably used therewith. Thus in the case of a small dog the extension rod 28b may be used to bring the head support unit into relatively close relation to the bar 42.

In FIG. 7 there is illustrated a modified form of head supporting means comprising a tubular bar 56 having a threaded end 57 for engagement with the socket 44 in substantially the same manner as the bar 42 is engaged, the threaded end having a longitudinal slot 58 for engagement by the thumb screw 47 to prevent turning. At its outer end the tubular bar 56 is provided with an angular extension 59 preferably disposed at an angle of substantially 45° and provided at its upper end with a friction clamp 20. An opening 60 is provided in the lower side of the bar in line with the passage through the angular extension to permit of the telescopic adjustable engagement of the extension rod 50 so that the head support unit 54 carried upon the upper end of the extension rod may be adjusted to the desired position to support the head of the animal. As in the other embodiment of the head supporting means the extension rod may be interchanged with the rods 28, 28a and 28b.

The head support unit 54, shown in detail in FIGS. 8-10, comprises a chin rest plate 61, preferably of rectangular outline rounded at its corners, provided at its upper side with a cushion layer 62 of sponge rubber or the like cemented thereto. Centrally at the under side of the plate and extending transversely thereof there is provided a ridge formation 63 having a passage 64 therethrough of rectangular cross-section opening to the sides of the chin rest plate, and centrally of the ridge formation there are provided a pair of spaced downwardly extending legs 65—65, disposed at each side of the flat-sided upper portion 66 of the pivot support member 53 and pivotally connected thereto by a shaft 67 provided at one end with a head 68 and secured at its other end by a cotter pin 69. A pressure screw 70 provided in one of the leg portions 65 and having an actuating lever handle 71 is adapted to be tightened against one flat side of the portion 66 to lock the position of angular adjustment of the head support unit relatively to the extension rod 50.

A pair of oppositely arranged L-shaped bars 72, each having a vertical slot 73 in its upright portion, have their horizontal base portions superimposed and engaged for lateral adjustment in the passage 64, the position of adjustment being fixed by a pressure screw 74 engaged through the lower side of the ridge portion 63 in the space between the leg portions 65—65 and provided with a forwardly projecting actuating lever handle 75.

Upon each of the bar members 72 there is mounted for vertical adjustment a clamp pad, adapted to engage and restrain upward movement of the head of the animal, and comprising a plate 76 of generally triangular shape rounded at its corners and curved inwardly at its upper portion, as at 77, a cushion pad 78 of sponge rubber or the like being cemented to its inner face. At its outer sides the plate 76 is provided with a guide way member 79, secured thereto as by welding, and slidably engaged for vertical adjustment upon the upright portion of the bar member 72, its position of vertical adjustment being fixed by a pressure screw 80 engaged through the slot 73 in the base of the guide way member and the plate 76 and provided with a wing head 81 adapted to bear upon the outer side of the bar 72 at each side of the slot.

The dot-and-dash lines in FIG. 9 indicate a vertically adjusted position of one of the clamp pads and the dot-and-dash lines in FIG. 10 indicate a laterally adjusted position thereof.

Figure 15:
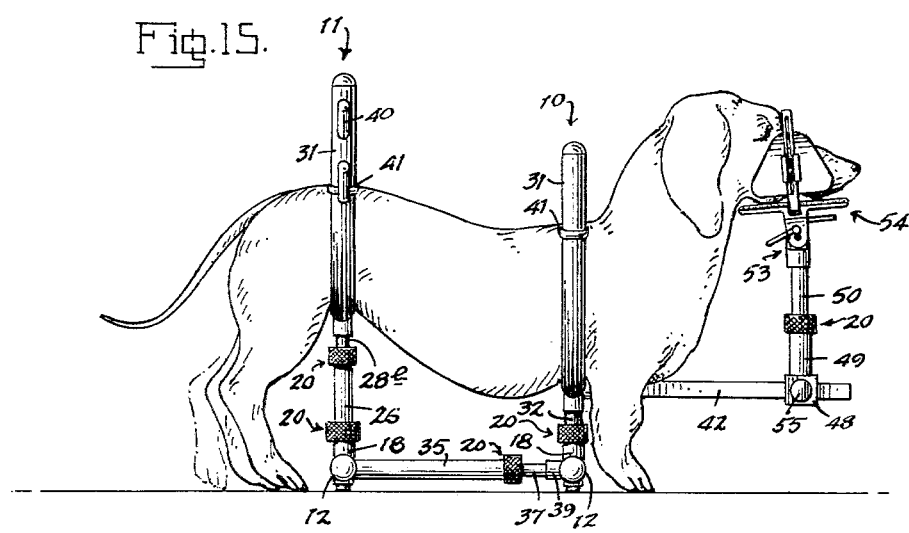
FIG. 15 is a side elevation showing the apparatus as applied to a dog of relatively small size.

As shown in FIGS. 14 and 15 the apparatus of the invention is fitted in one case to a large-sized dog, for example a boxer, and in the other case to a small-sized dog, for example, a dachshund. The procedure of restraining the dog consists in first adjusting the apparatus both longitudinally and vertically to approximately fit the particular dog. The dog is then placed in the apparatus with the cradle support of the forward support frame 10 directly behind the forelegs and the cradle support of the rear support frame 11 just forward of the hind legs, where-upon the apparatus may be exactly adjusted longitudinally and vertically to fit the particular dog in a normal standing position. The retaining elastic bands 41 are placed upon the forward and rearward cradles over the shoulder and hind quarters of the dog. The head support unit is also suitably adjusted, to the proper height and angle to receive the chin of the dog upon the chin rest plate 61, and the clamp pads are adjusted to fit against the sides of the head and partially over the dog's snout. Movement of the dog's head is thus effectually restrained. The veterinarian then adjusts both the forward and rearward frame support upwardly to a point where the legs will stretch or extend and the paws of the dog are not firmly implanted upon the table or other supporting surface, in which position the animal is prevented from gaining sufficient traction or purchase upon the supporting surface to propel itself. Thus the dog is effectually restrained and immobilized to enable the veterinarian to perform any desired operations which require that the animal be restrained in a standing position.

What is claimed is:

1. A portable restraining apparatus for a four-legged animal comprising forward and rearward frame supports, each including base means for engagement with a horizontal supporting surface, rigid U-shaped body-restraining cradle means for engaging beneath and at the sides of the body of an animal including a relatively narrow lower portion positioned to underlie the animal's body having relatively narrow outer lateral portions flanking and extending upwardly around and beyond the animal's body, vertically adjustable support means between said base means and said cradle means, and longitudinally adjustable connection means joining said forward and rearward frame supports and forming therewith a portable unitary base for the restraining apparatus.

2. The invention as defined in claim 1, wherein said vertically adjustable support means comprises a plurality of telescoping members, and friction clamp means cooperating between said members for fixing the position of vertical adjustment.

3. The invention as defined in claim 1, wherein said vertically adjustable support means of each of said forward and rearward frame supports comprises a tubular post member secured to said base means, friction clamp means carried by said tubular post member, and a plurality of selective extension rods of different lengths for engagement of a selected one with said tubular post, and means for detachably connecting said extension rods to said cradle means.

4. The invention as defined in claim 1, wherein said vertically adjustable support means of each of said forward and rearward frame supports comprises a tubular extension post fixed to said base means, friction clamp means carried by said tubular post, a second tubular extension post for telescoping engagement with said first tubular extension post, friction clamp means carried by said second tubular extension post, an extension rod telescopingly engaged in said second tubular post, and means for detachably connecting said extension rod to said cradle means.

5. The invention as defined in claim 1, wherein said base means of said forward and rearward frame supports and said longitudinally adjustable connection means constitute an H-formation, wherein said base means and said vertically adjustable support means of each of said forward and rearward frame supports constitutes an inverted T-formation.

6. The invention as defined in claim 1, further characterized by a pair of elastic band members for stretchable engagement with the sides of the respective cradle means.

7. The invention as defined in claim 1, further characterized by head supporting means carried by said forward frame support including a head support unit incorporating a chin rest member positioned to underlie the animal's chin and an adjustable connection between said head support unit and said forward frame support adapted to adjust the position of said head support unit vertically and horizontally.

8. The invention as defined in claim 7, wherein said head supporting means comprises a horizontal bar fixed to said forward frame support, and a vertically adjustable support means horizontally adjustable upon said bar, said head support unit being carried upon the upper end of said vertically adjustable support means.

9. The invention as defined in claim 7, wherein said head supporting means comprises a horizontal bar fixedly secured to said forward frame support, an angular tubular extension carried by said horizontal bar, friction clamp means carried by said angular tubular extension, and an extension rod telescopingly engaged in said tubular extension, said head support unit being carried at the upper end of said extension bar.

10. The invention as defined in claim 7, further characterized in that said adjustable connection includes a standard, and said chin rest member is pivotally supported upon said standard for tilting adjustment about a horizontal axis, means for fixing the position of adjustment of said chin rest member, a pair of side pad members for engaging the sides of the head of the animal, means for adjusting said side pad members laterally with respect to said chin rest member, means for fixing the position of lateral adjustment of said side pad members, means for adjusting said side pad members vertically with respect to said chin rest member, and means for fixing the position of vertical adjustment of said side pad members.

11. The invention as defined in claim 10, further characterized in that said side pad members each comprise a substantially vertical lower portion and an inwardly curved upper portion adapted to engage in retaining relation over the snout of the animal.

12. The invention as defined in claim 10, wherein said chin rest member and said side pad member each include a facing layer of cushion material.

13. A head support for restraining the head of a four-legged animal comprising a standard adapted to be supported in a fixed position relatively to the animal, a chin rest member pivotally supported upon said standard for tilting adjustment about a horizontal axis, means for fixing the position of adjustment of said chin rest member, a pair of side pad members for engaging the sides of the head of the animal, means for adjusting said side pad members laterally with respect to said chin rest member, means for fixing the position of lateral adjustment of said side pad members, means for adjusting said side pad members vertically with respect to said chin rest member, and means for fixing the position of vertical adustment of said side pad members.

References Cited by the Examiner
UNITED STATES PATENTS

| | | | |
|---|---|---|---|
| 572,792 | 12/1896 | Gates | 119—103 |
| 1,109,772 | 9/1914 | Leyh | 119—97 |
| 2,536,268 | 1/1951 | Dillon | 17—44 |
| 2,773,477 | 12/1956 | Michael | 119—103 |
| 2,804,845 | 9/1957 | Plumley et al. | 119—102 |
| 2,914,026 | 11/1959 | Greenwood | 119—103 |
| 3,023,734 | 3/1962 | Schaub | 119—99 |
| 3,092,079 | 6/1963 | Strebel et al. | 119—103 |
| 3,120,836 | 2/1964 | Brauning | 119—103 |
| 3,137,273 | 6/1964 | Greenwood | 119—103 |

SAMUEL KOREN, *Primary Examiner.*

ALDRICH F. MEDBERY, *Assistant Examiner.*